C. F. SCHUH.
ELECTRIC BATTERY.
APPLICATION FILED AUG. 9, 1912.
1,061,572.
Patented May 13, 1913.
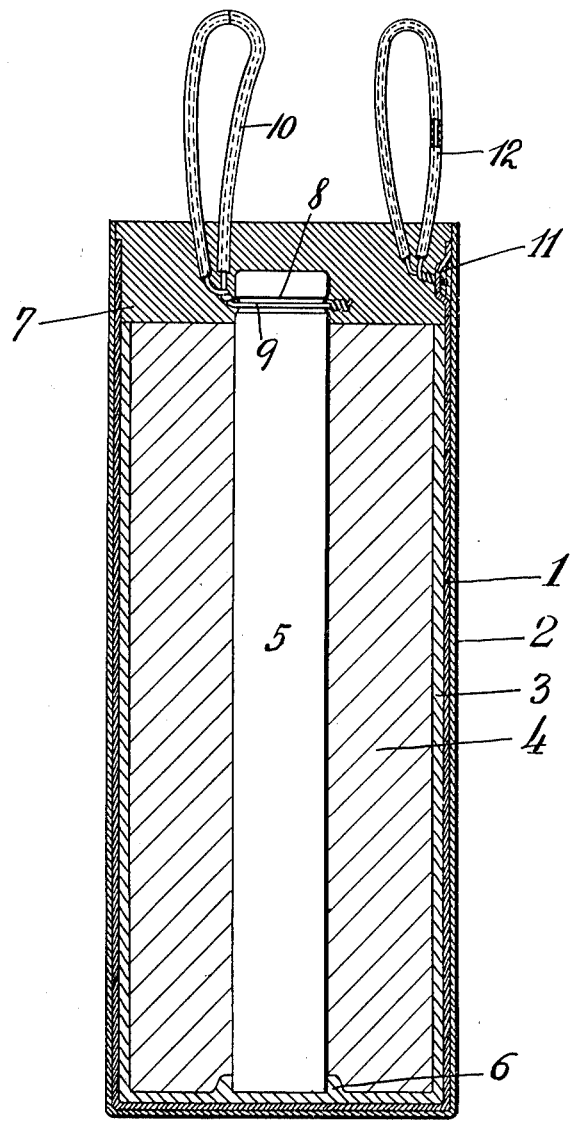

UNITED STATES PATENT OFFICE.

CHARLES F. SCHUH, OF NEWARK, NEW JERSEY, ASSIGNOR OF ONE-HALF TO ROBERT J. WILKIE, OF SAUGUS, MASSACHUSETTS.

ELECTRIC BATTERY.

1,061,572.          Specification of Letters Patent.        Patented May 13, 1913.

Application filed August 9, 1912. Serial No. 714,145.

*To all whom it may concern:*

Be it known that I, CHARLES F. SCHUH, a citizen of the United States, residing at Newark, in the county of Essex and State of New Jersey, have invented certain new and useful Improvements in Electric Batteries, of which the following is a full, clear, and exact specification.

This invention relates to improvements in electric batteries.

More particularly, this invention is an improvement in the terminal arrangement of electric batteries, whereby superior results in the connection of the terminals with the conductors of the circuit with which the battery is to be used, are secured, and at the same time securing advantages in carrying, handling or shipping a battery without danger of short circuiting. In the ordinary construction and arrangement of batteries, particularly dry batteries, the terminals of the positive and negative elements are disposed in very close relation, and short circuits frequently ensue by relatively small pieces of metal or other conductor bridging the terminals. In addition, such prior forms of batteries, usually cylindrical in shape, are inconvenient or difficult to be carried, unless a special tray or receptacle is provided. In accordance with my invention, the terminals of the battery elements are in the form of elongated, and usually flexible conductors, which are secured in good electrical contact to the respective battery elements, preferably within the seal of the battery; such terminal conductors extend exteriorly of the seal, and at least the portions thereof exterior of the seal are covered with suitable insulation, whereby the battery may be carried without danger of short circuiting or leakage, and at the same time affording more space between the terminals for connection with the circuit wires. After the battery has been shipped or carried to the place of use, the insulation of the terminal conductors may be wholly or partly removed to allow the connections with the circuit wires to be made.

Other objects and features of my invention will be more fully understood from the following description and the accompanying drawing in which is illustrated a dry battery embodying my invention.

The positive element 1, in the form of a cylinder of zinc, is protected and carried by the outside container 2. Adjacent the inner side of the zinc cylinder is disposed the casing 3 of absorbent material and containing the active electrolyte and depolarizer 4, as will be understood. The carbon or negative element 5 is shown seated in a raised recess 6 in the bottom of the inner casing 3. The upper end of the carbon electrode 5 preferably does not extend exterior of the seal 7 of suitable insulating material, such as treated paper, wood or the like. Proximate the upper end of the carbon electrode 5 is provided a groove 8, whereby an uninsulated end 9 of the flexible terminal 10 may be wound, or otherwise securely maintained in good electrical contact with the electrode 5. As indicated in the drawing, the end 9 of the flexible terminal 10 is wound about the electrode 5 in such relation to the seal 7 whereby the seal coöperates in maintaining efficient electrical contact. The conductor 10 is shown in the form of a loop of insulation-covered wire, with both ends 9 of the loop stripped of insulation and wrapped about the electrode 5 in groove 8; however, under certain circumstances, such terminal 10 need not be a loop, but may simply be a length of wire with one end only connected to the electrode, and of sufficient length to secure the desired improved results.

The zinc electrode 1 is provided with a pressed or expanded portion 11 for connection with its flexible terminal conductor 12. The terminal conductor 12 is similar to the conductor 10. In the form illustrated, terminal conductor 12 is a loop of insulation-covered wire, the two bared ends of the loop being twisted together and jointly soldered to the pressed or expanded portion 11. However, as indicated above, the terminal conductor 12 may be a straight length of insulation-covered wire with one end only suitably connected to the zinc cylinder or positive element. Preferably, the connection of the terminal is made within the seal of the battery, as indicated in the drawing, whereby the seal protects the electrical connection from chemical action, as well as changes due to the weather and atmosphere, and also mechanically retains the terminal conductor in position.

When the terminals 10, 12 are in the form of loops, such loops afford ready means for carrying the battery from place to place, and similarly when two or more batteries are carried or otherwise handled. It will be noted that the manner of connection of the extended terminals of my battery afford a convenient grip for manual handling of the battery, and also for mechanically carrying one or more batteries, as with a rod or pole, or the like. I have obtained superior results, in the case of looped terminal conductors, by circumferentially cutting loose, soft rubber tube insulation and putting the sections under slight compression, so that they can be slid apart for testing or momentary contact and then spring back together, thereby guarding against short circuiting, as indicated at the terminal 10. When a permanent connection is desired, the insulation is removed from the terminal loops, and can then be readily twisted into good electrical contact with the other circuit wires and covered with tape, without having any exposed terminals.

In this invention, the seal maintains the terminals in good contact with the elements and surrounds the insulation on the flexible terminals so that no separation occurs. Batteries made according to this invention are readily shipped and stored without discharging and are particularly useful where carried about by a lineman for testing purposes, or thrown with metal or tools, as in an electrician's kit or automobile kit, and the like.

Various changes and modifications may be made in the specific form illustrated without departing from my invention.

Having thus described my invention, I declare that what I claim as new and desire to secure by Letters Patent is:—

1. In a battery, the combination with an electrode and sealing means for the battery, of a loop of conducting material connected to the electrode and serving as the terminal thereof, the ends of said loop being covered with insulation and unexposed for connection to a circuit wire, said loop intermediate its ends being covered with insulating material, a portion of which is removable whereby to connect a circuit wire to the loop.

2. In a battery, the combination with an electrode and sealing means for the battery, of a loop of conducting wire connected to the electrode and serving as the terminal thereof, the ends of said loop being disposed interiorly of the sealing means, the portion of the loop exterior of the sealing means being covered with insulation, a portion of which insulation is displaceable under pressure.

3. In a battery, the combination with an electrode and sealing means for the battery, of a loop of conducting wire serving as the terminal of the electrode, one end of said loop being connected directly with the electrode, the other end of said loop being disposed interiorly of the sealing means, the portion of said loop exterior of the sealing means being covered with removable insulation.

4. In a dry battery the combination with the battery electrodes and sealing means for the battery, of loops of conducting wire connected respectively to the battery electrodes and serving as the terminals thereof, both ends of each of said loops being embedded in insulation and unexposed for connection to circuit wires, the portion of each loop intermediate the ends being covered with insulation which is displaceable under pressure.

In testimony whereof I affix my signature, in presence of two witnesses.

CHARLES F. SCHUH.

Witnesses:
J. S. WOOSTER,
K. G. LEARD.